United States Patent [19]

Frandon

[11] 3,740,732

[45] June 19, 1973

[54] DYNAMIC DATA STORAGE CELL

[75] Inventor: Pierre M. Frandon, Cagnes-sur-Mer, France

[73] Assignee: Texas Instruments Incorporated, Dallas, Tex.

[22] Filed: Aug. 12, 1971

[21] Appl. No.: 171,280

[52] U.S. Cl. ............ 340/173 R, 307/238, 307/279, 317/234 Q, 317/235 W

[51] Int. Cl. ............ G11c 11/40

[58] Field of Search ............ 340/173 R; 307/238, 307/279; 317/234 Q, 235 W

[56] References Cited

UNITED STATES PATENTS

| | | | |
|---|---|---|---|
| 3,387,286 | 6/1968 | Dennard | 340/173 R |
| 3,549,911 | 12/1970 | Scott | 340/173 R |

*Primary Examiner*—Terrell W. Fears
*Attorney*—James O. Dixon, Andrew M. Hassell, Harold Levine et al.

[57] ABSTRACT

A dynamic data storage cell is disclosed that requires only one insulated gate field effect transistor (IGFET) to store binary data. The drain of the FET is connected to a data input line and data is stored at the source node of the transistor by the inherent capacitance between the source diffusion and the substrate. The capacitance of the source electrode is enhanced by forming a heavily doped layer to underlie a portion of the source diffusion. Using the substrate as circuit ground enables the fabrication of an array of transistors for a random access memory wherein the surface area of the semiconductor chip is minimized.

6 Claims, 7 Drawing Figures

INVENTOR
Pierre M. Frandon
BY Richard L. Donaldson
ATTORNEY

DYNAMIC DATA STORAGE CELL

This invention pertains to data storage cells in general and more specifically to a dynamic one transistor storage cell. In semiconductor fully decoded random access memories, the memory array itself generally represents 40–60 percent of the chip area. Any reduction of the basic memory size enables a greater packing density and resultant decreases in production costs. Further, reduction in the number of active elements or transistors required for each memory cell increases yield, since one of the major problems associated with IGFETs results from forming metal over thin oxide regions to define the gate of the FET.

One technique that has been proposed for reducing the size required for a memory cell of a random access memory utilizes a single IGFET as the storage cell. This produces a dynamic memory cell, data being represented in the form of stored charge at the source node of the transistor utilizing the inherent metal-insulator-semiconductor and P-N junction capacitances of the device. The data stored in each cell must be refreshed periodically due to capacitance leakage, etc. A description of one such transistor cell may be found in copending application entitled ONE TRANSISTOR DYNAMIC MEMORY CELL (TI–4549) assigned to the assignee of the present invention. In this memory cell the capacitance of the source node of the IGFET is enhanced by forming an additional capacitor over an extended portion of the source diffusion. Preferential diffusion techniques are utilized to form a highly doped region under a portion of the source diffusion. To complete fabrication of the capacitor a metal line is formed to overlie an oxide layer that covers the surface of the wafer, the oxide having a thin region at the location where a capacitor is to be formed. The metal line must be connected to the substrate to complete the circuit of the capacitor. Thus, for each transistor of the memory array a connection must be made to a ground line that connects to the substrate. By way of example, in a 1024 bit RAM, 1024 contacts are required in the memory. Such contacts adversely affect the failure rate in the memory.

Accordingly, an object of the present invention is to provide an improved single transistor dynamic storage cell.

In accordance with the present invention, a dynamic data storage cell includes spaced apart source and drain diffusions extending to the surface of a semiconductor substrate. A relatively thick insulating layer overlies the substrate and has a thin region overlying the channel of the transistor. A conductive layer extends over the thin insulating region to form the gate of the transistor. Data information is stored at the source electrode of the transistor due to the inherent capacitance of the IGFET structure and the P-N junction capacitance. The P-N junction capacitance is enhanced to enable data storage by forming a highly doped region of the same conductivity type as the substrate to underlie a portion of the diffused source region. This highly doped region, however, does not extend to the boundary of the source diffusion adjacent the drain diffusion.

A plurality of the single transistor memory cells may be formed in a matrix of randomly selectable memory cells. A first set of substantially parallel elongated diffused regions extend into the chip from one surface thereof. These regions are of opposite conductivity type from the semiconductor chip, and define respective column data input lines of the matrix. A second set of substantially parallel elongated diffused regions of the same conductivity type as the substrate, but having a higher conductivity, are spaced from and are interleaved in a substantially parallel relationship with the first set of diffused regions. A third set of diffused regions of the same conductivity type as the first set of diffused regions overlie and extend into selected spaced apart portions of the second set of diffused regions, forming P-N junctions therewith, each of the third set of regions extending at the surface of the substrate laterally beyond the boundary of the underlying diffused region of the second set. The distance between the boundary of each of the third regions and an adjacent boundary of the first set of diffused regions defines the channel length of the field effect transistor. A relatively thick insulating layer overlies the substrate and has a relatively thin region in registry with each of the channels. A set of spaced apart elongated conductive strips overlie the thin regions of the insulative layer to form the gates of the field effect transistors which define the matrix of memory cells.

Figure 1:
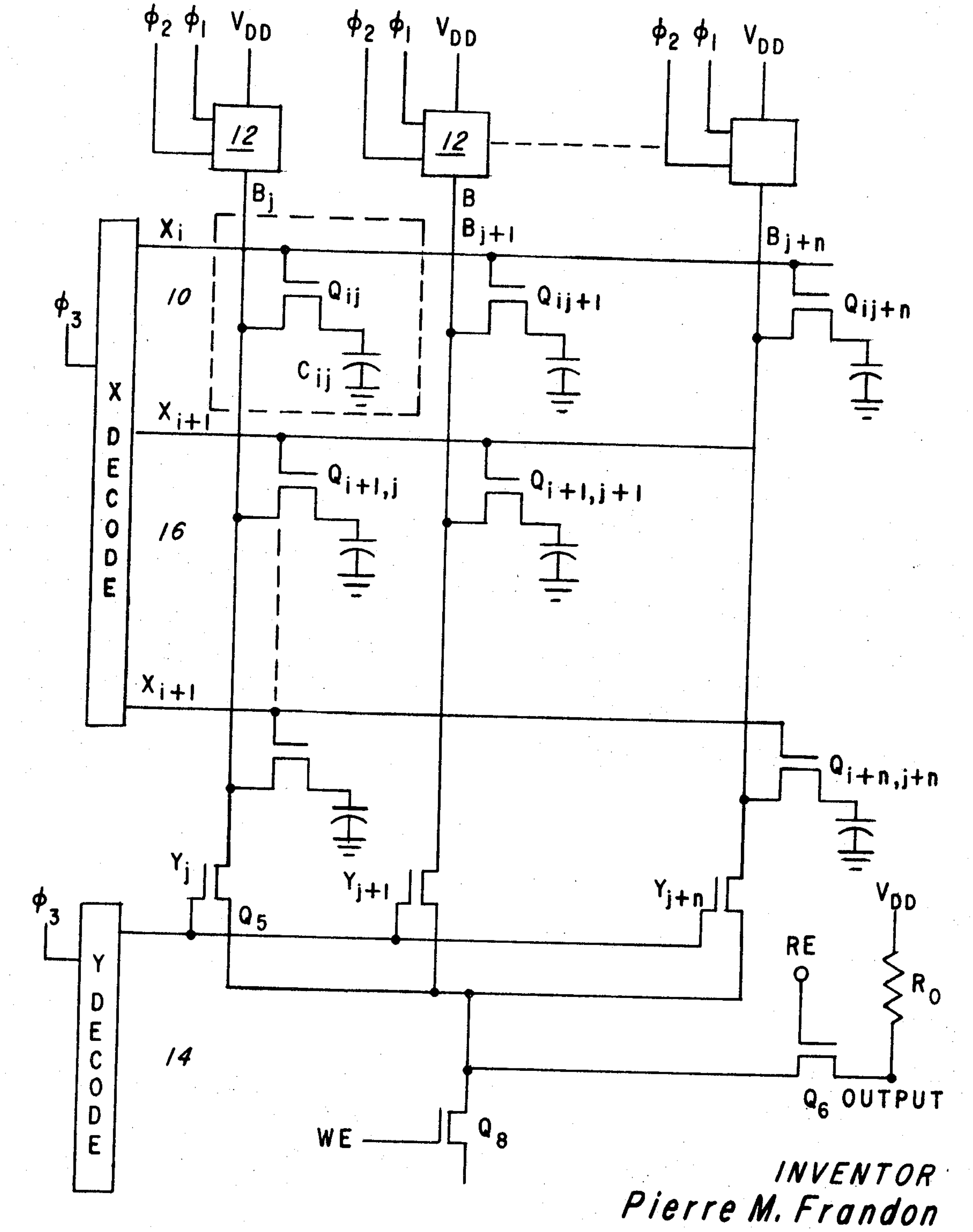
FIG. 1 is a partial schematic and a partial block diagram illustrating a dynamic random access memory using the improved single transistor data information data storage cell of the present invention.

With reference now to FIG. 1, a random access memory system incorporating the one transistor dynamic memory cell of the present invention is illustrated. A basic one transistor memory cell is illustrated within the block formed by the dashed line 10. The RAM includes a matrix of storage cells 10 arranged in rows and columns; various rows of the matrix being labeled as lines $X_i$, $X_{i+1}$, . . . $X_{i+n}$, while various columns of the matrix are illustrated by the data lines $B_j$, $B_{j+1}$, . . . $B_{j+n}$. As may be seen, all of the IGFET's memory cells in a row have their bases connected to a row control line such as $X_i$, while all of the IGFET/memory cells in a column have drains commonly connected to a data line such as $B_j$. Each column data line is connected to data refreshing circuitry shown generally at 12. The refresh circuitry has a $V_{DD}$ voltage source connected thereto and two clock inputs $\phi_1$ and $\phi_2$. As will be explained hereinafter during the discussion of FIG. 2, the refresh circuitry 12 is operative to refresh the stored data in each memory cell 10 during a cycle of operation.

Each column data line also has switching means such as transistor $Q_5$ to provide access to that data line for reading and writing operations. The base of the transistor forming the switching means for each column data line is connected to Y decode means illustrated generally at 14. Access to a specific cell in the RAM is obtained when the base of a column enable switch, such as the base $Y_j$ of transistor $Q_5$ is activated simultaneously with activation of a row enable line such as $X_{i+1}$. The row enable lines $X_i$, $X_{i+1}$ and $X_{i+n}$ are activated by X decode means 16. Thus, by way of example, when the base $Y_j$ of transistor $Q_5$ is activated simultaneously with the row line $X_{i+1}$ the transistor $Q_{i+1,j}$ is uniquely selected in the matrix of memory cells, and at this time information may be written into this memory cell or read out of the memory cell, as will be explained hereinafter. Various X and Y decode circuits are well known in the art. One decode circuit that may be utilized in accordance with the present invention is illustrated in FIG. 6.

Figure 2:
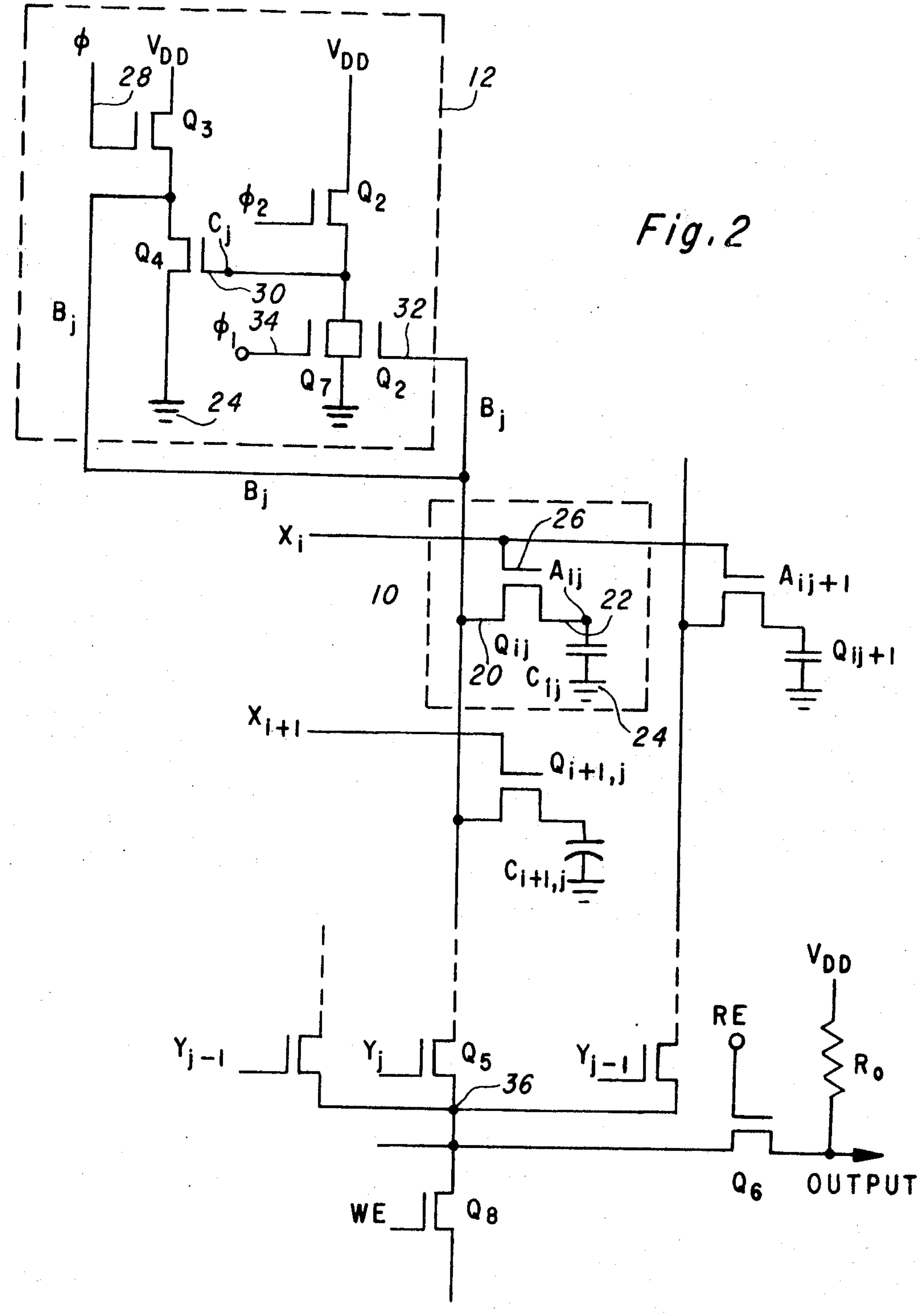
FIG. 2 is a schematic diagram depicting the dynamic memory cell in accordance with the present invention connected to associated refresh decode and read/write circuitry.

FIG. 2 schematically represents one column of data storage cells 10 with the associated refresh circuitry 12, column enable switch $Q_5$ and read enable transistor $Q_6$ and write enable transistor $Q_8$. Each memory cell 10 comprises an IGFET such as transistor $Q_{ij}$. The drain 20 of the transistor $Q_{ij}$ is connected to the data line $B_j$ and the source 22 is connected through a capacitance $C_{ij}$ to circuit ground 24, which, for example, may be the substrate of an integrated circuit structure. Data is stored by the memory cell 10 in the form of stored charge at the node $A_{ij}$. The gate 26 of transistor $Q_{ij}$ is connected to the control line $X_i$ which is connected to the X decode circuitry 16 (FIG. 1).

By way of example, the refresh circuitry 12 for each column data line is illustrated as including transistors $Q_1$, $Q_2$, $Q_3$, $Q_4$, and $Q_7$. It is to be understood, of course, that this refresh circuit is by way of illustration only, and that other refresh circuits known to those skilled in the art may be utilized if desired. The refresh circuitry illustrated in FIG. 2 includes, for each column, two IGFET series inverters of which the input and output are tied to data line $B_j$. The source-drain circuits of transistor $Q_3$ and $Q_4$ are connected in series between circuit ground 24 and a voltage $V_{DD}$. This voltage supply may be either negative or positive depending upon whether N-channel or P-channel devices are used and may generally be in the range of 12 volts for high threshold devices. The juncture of transistors $Q_3$ and $Q_4$ is connected to the column data line $B_j$. The gate 28 of transistor $Q_3$ is connected to a first clocking signal $\phi_1$. The source-drain circuits of transistors $Q_1$ and $Q_2$ are also series connected between the voltage supply $V_{DD}$ and circuit ground. The juncture between the transistors $Q_1$ and $Q_2$ is connected to the base 30 of transistor $Q_4$. The capacitance at this node will be referred to hereinafter as $C_j$. The gate 32 of transistor $Q_2$ is connected to column data line $B_j$. An additional transistor $Q_7$ is connected in parallel with the source-drain circuit of transistor $Q_2$. The base 34 of transistor $Q_7$ is connected to clocking signal $\phi_1$.

Each column enable or column switching means may comprise an IGFET such as $Q_5$ having a source-drain circuit connected in series with the corresponding column data line such as $B_j$. The base $Y_j$ of transistor $Q_5$ is connected to Y decode means 14 (FIG. 1). The column enable switches in the matrix have a common node 36 connected to write enable (WE) and read enable (RE) devices $Q_8$ and $Q_6$ respectively.

Figure 3:
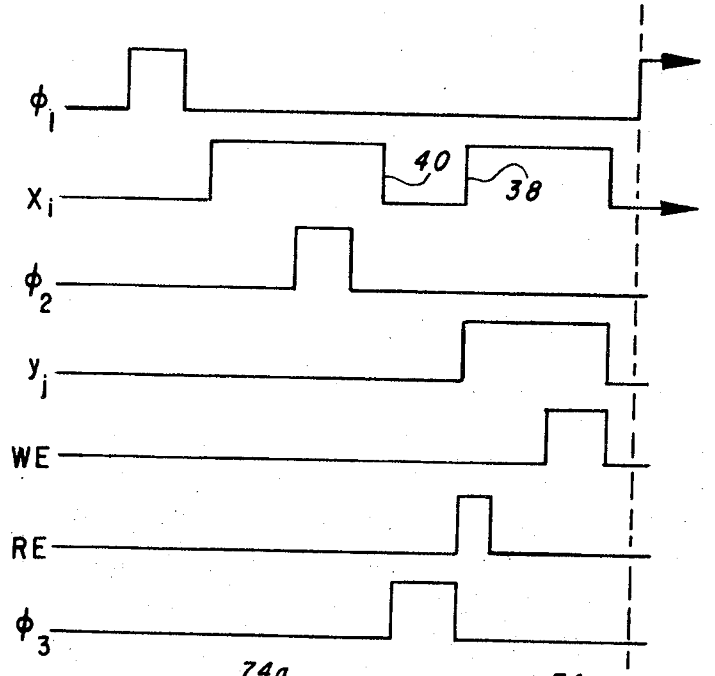
FIG. 3 is a graph of waveforms that may be utilized in operating the dynamic random access memory illustrated in FIG. 1.

With reference to FIGS. 2 and 3, operation of the single transistor memory cell of the present invention will now be described. In FIG. 3, the waveforms required to effect one cycle of operation of the dynamic random access memory are illustrated. In general, the cycle can be divided into two portions, a first portion wherein the stored data in each cell of the random access memory is refreshed, and a second portion wherein the data stored in a selected memory cell may be operated upon, i.e., data may be read from the cell and/or written into the cell.

The refresh cycle is initiated by application of clock-pulse $\phi_1$ to the base 28 of transistor $Q_3$ and to the base 34 of transistor $Q_7$. Clock $\phi_1$ biases on transistor $Q_7$ and insures that the capacitance $C_j$ at the base 30 of transistor $Q_4$ is discharged, insuring that transistor $Q_4$ remains biased off. Clock pulse $\phi_1$ also biases on transistor $Q_3$ enabling application of the voltage supply $V_{DD}$ to the column data storage line $B_j$, charging the capacitance of this line to a high value. The clock pulse $\phi_1$ is then terminated, leaving data line $B_j$ in a "high" condition and leaving the capacitance $C_j$ in a "low" or ground state condition. During this sequence, all of the column data lines $B_j$ through $B_{j+n}$ are charged to a high condition. In the next step of the cycle a row enable line of the matrix, such as $X_i$, is activated, i.e., brought high. This couples all of the transistors in that row of the matrix to corresponding column data lines. For clarity of description, the conditions associated with only one of the transistors, $Q_{ij}$ will be discussed. At the time that line $X_i$ is activated, two conditions must be considered. First, the data previously stored in the memory cell comprising $Q_{ij}$ may have been a logic 1 or high level. For this situation, the data line $B_j$ discharges very little into the transistor $Q_{ij}$, since the node $A_{ij}$ is already charged to a high value. Thus, the gate 32 of transistor $Q_2$ remains at a high value, clamping the base 30 of transistor $Q_4$ to circuit ground. The second situation to be considered is where no data or a logic 0 was stored by the node $A_{ij}$. For this situation, the data line $B_j$ discharges into the transistor $Q_{ij}$. If the capacitance of the data line $B_j$ equals the capacitance at node $A_{ij}$, $B_j$ will discharge until its voltage equals the voltage at node $A_{ij}$. This voltage is below the threshold for biasing on transistor $Q_2$ (assuming that the capacitance at node $A_{ij}$ is sufficiently large).

In the next step of the refresh cycle, clock-pulse $\phi_2$ is brought high biasing on transistor $Q_1$. For the situation where a 1 had previously been stored in the memory cell comprising $Q_{ij}$, transistor $Q_2$ is biased on supplying a ready path for $V_{DD}$ to circuit ground. Thus, the capacitance $C_j$ at the gate 30 of transistor $Q_4$ remains low and transistor $Q_4$ remains biased off, leaving the data line $B_j$ high, refreshing the stored charge at node $A_{ij}$. On the other hand, where a logic 0 had previously been stored at the node $A_{ij}$, transistor $Q_2$ is not biased on, and in response to the clock $\phi_2$ the voltage V supply $V_{DD}$ charges the capacitance $C_j$ at the gate 30 of transistor $Q_4$. This connects the data line $B_j$ to circuit ground through the source drain circuit of transistor $Q_4$, assuring that the node $A_{ij}$ is discharged to a low value thereby refreshing the 0 stored at that location. Clock $\phi_2$ is then turned off terminating the refresh cycle. A similar procedure is followed for each row data line $X_i$ through $X_{i+n}$.

In the second portion of the cycle the data stored in a selected cell of the matrix of the RAM may be operated upon. Assume, for example, that it is desired to read the data stored in the cell $Q_{ij}$. This may be accomplished by bringing the row data input line $X_i$ high as indicated in the region 38 at the $X_i$ waveform in FIG. 3. This couples the column data input line $B_j$ to the transistor $Q_{ij}$. Concurrently with bringing the data line $X_i$ high, one of the column data lines $B_j$ through $B_{j+n}$ is selected by Y select switches such as transistor $Q_5$. By applying a high signal to the base $Y_j$ of transistor $Q_5$, the column $B_j$ is selected for data operation. It is understood, of course, that in order to select a specific memory cell only one column line and only one row line of the memory matrix may be concurrently energized during read and write operations. Assuming for purposes of example that transistor $Q_5$ is biased on by a gate signal $Y_j$ and that the data memory cell comprising transistor $Q_{ij}$ is coupled to the data line $B_j$ by activating the row data line $X_i$, then the data content or the data stored at at the node $A_{ij}$ may be read by applying a read enable (RE) signal to the base of transistor $Q_6$. For the situation where a 0 is stored at the node $A_{ij}$, it will be recalled that during the refresh cycle the capacitance $C_j$ at the gate 30 of transistor $Q_4$ is charged high. Thus, transistor $Q_4$ remains in a biased on condition after termination of the refresh cycle. Upon application of the read enable signal to transistor $Q_6$, current from the source $V_{DD}$ flows through output resistance $R_0$ through the source-drain circuits of transistor $Q_6$, $Q_5$ and $Q_4$ to circuit ground 24. Presence of an output voltage across the output resistance $R_0$ represents a logic 0.

Consider the situation, on the other hand, where a 1 is stored at the node $A_{ij}$. It will be recalled that at termination of the refresh cycle the node 30 of transistor $Q_4$ has a low capacitance $C_j$, due to the path to ground through transistor $Q_2$, and thus transistor $Q_4$ remains off. Now, activating the read enable signal has no effect, i.e., there is no path to circuit ground for $V_{DD}$, and thus, there is an absence of current flow through resistance $R_0$ and no output voltage is generated. Absence of an output voltage is equated to a logic 1 stored at the node $A_{ij}$.

To write information into, i.e., store a charge at the node $A_{ij}$, the memory cell is selected for data operation as previously explained, i.e., $X_i$ and $B_j$ are simultaneously activated. A write enable (WE) signal is applied to the base of transistor $Q_8$ to connect the line $B_j$ to the input data source. For the situation where a 1 had previously been stored in the selected data cell, such as the data cell containing transistor $Q_{ij}$, the data line $B_j$ is isolated from circuit ground, since transistor $Q_4$ remains in the off condition after the refresh cycle. Thus, the desired data may be written into the node $A_{ij}$ by applying either a high signal or a low signal through the source-drain of transistor $Q_8$. Consider, however, the situation where a 0 had previously been stored in the selected data cell. As previously explained, for this situation the data line $B_j$ is connected to circuit ground through transistor $Q_4$ upon termination of the refresh cycle. Thus, when it is desired to write, for example, a 1 into the node $A_{ij}$, a path is provided for current through transistor $Q_8$, $Q_5$ and through transistor $Q_4$ to ground. It will be noted, however, that the source-drain circuit of $Q_4$ provides a resistance and thus, the voltage level V of $B_j$ rises as current is dissipated through this resistance. As soon as the level $B_j$ rises to the threshold value of transistor $Q_2$, this transistor is biased into conduction and the node $C_j$ discharges to circuit ground, thereby turning off transistor $Q_4$. This enables the line $B_j$ to become charged to the level required for writing a logic 1 into the node $A_{ij}$.

Figure 4:
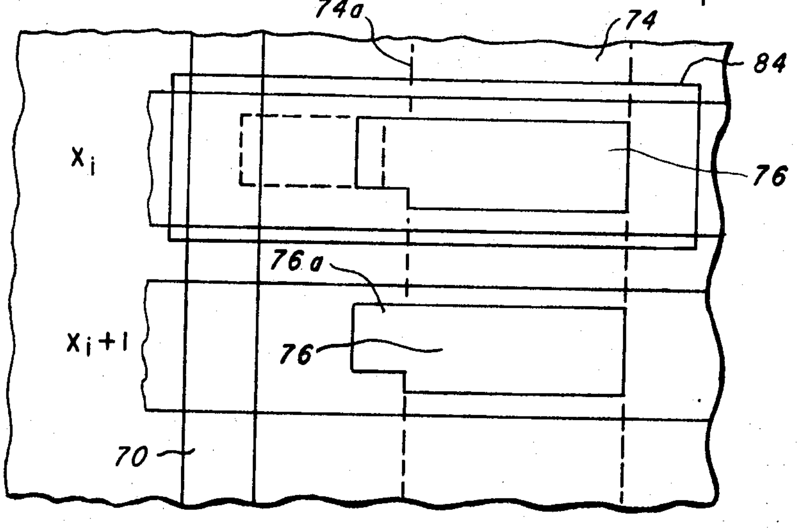
FIG. 4 is a plan view illustrating the memory cell of the present invention in integrated circuit form.
Figure 5:
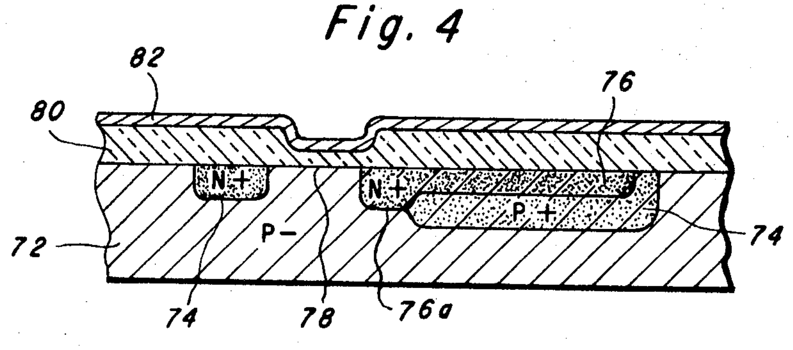
FIG. 5 is a cross-section along the line A–A' in FIG. 4.

With reference to FIGS. 4 and 5, a single transistor memory cell of the present invention is illustrated as it may be formed in an integrated circuit configuration. In FIGS. 4 and 5 an N-channel insulated field-effect transistor is described. It is to be understood, of course, that P-channel devices may also be used in accordance with the present invention.

An elongated N+ diffused region 70 forms the drain electrode of all of the insulated gate field-effect transistor memory cells in a column of a memory matrix. By way of example, the line 70 corresponds to the data input line $B_j$ illustrated in FIG. 1. The diffused region 70 extends to the surface of the substrate 72, which may, for example, comprise P-type silicon having an impurity concentration on the order of $10^{15}$ atoms/cm$^3$. A P+ diffused region is formed in the region 74 which is substantially parallel to the region 70. When forming a matrix of memory cells, the region 74 would extend continuously across the length of the matrix. As will be explained hereinafter the P+ region enhances the P-N junction capacitance of the source electrode which is subsequently formed to overlie the P+ region 74 and thus enables more efficient storage of data information at the source node of the IGFET. A plurality of N+ diffused regions 76 are formed to extend into the P+ region 74 at selected spaced apart locations. The N+ regions 76 respectively form the source electrode of an IGFET. The diffused regions 76 are formed so that a region **76*a* extends laterally beyond the boundary 74*a* of the P+ diffused region 74 adjacent the drain diffused region 70. Preferably, the region 76*a* extends on the order of 0.2 mils from the boundary 74*a* to insure that a localized increase of the channel threshold voltage is avoided, which might otherwise occur if the P+ region were allowed to extend to the boundary of the N+ region 76 adjacent the drain electrode 70. The region 78 of the substrate 72 between the boundaries of the N+ region 76 and the N+ region 70 defines the channel of the IGFET. A P-N junction is formed between each N+ region 76 and the P+ region 74. Since both of these regions have relatively high impurity concentrations, the P-N junction capacitance is relatively large. A large capacitance is required, since for optimum operation of the memory cell, the capacitance of the data input line $B_j$, which includes the diffused region 70, should equal the capacitance at the source node 76** of the IGFET. Generally, it is desirable to enhance the capacitance at this node as much as possible to as closely as possible match the capacitance of the input data line $B_j$.

A relatively thick insulating layer 80 overlies the surface of the substrate 72. This layer may, for example, comprise silicon oxide dioxide formed to a thickness of, for example, 10,000 A. Other insulating material such as silicon nitride etc. may be utilized if desired. In the region overlying the channel 78, the insulator 80 is formed to be relatively thin so that a gate for the IGFET may be formed. The thin insulating layer may, for example, be on the order of 500 A thick and may comprise either silicon dioxide, silicon nitride or a combination thereof. Techniques for forming the oxide layer and gate regions are well known in the art and need not be explained in greater detail herein. A conductive layer 82 overlies the insulating layer 80. The layer 82 is patterned into conductive strips substantially perpendicular to the elongated regions 70 and 74. The conductive strips overlie the thin oxide regions in the area 78 to form gates of the insulated gate field-effect transistors. The layer 82 may, for example, comprise aluminum, silicon, etc. With reference to FIG. 1, the conductive strips 82 may, for example, comprise the row data input lines $X_i - X_{i+n}$.

One memory cell of the present invention is enclosed by the dashed lines 84. This cell may, for example, be formed in accordance with conventional fabrication techniques to have a size of 1 × 2.6 mils, giving a total memory cell size of 2.6 square mils.

The memory cell illustrated in FIGS. 4 and 5 has several advantages. First, it is to be noted that separate ground lines are not required to be connected to each individual cell, since the substrate is used as ground reference. This obviates the necessity of making additional contacts to individual memory cells. Thus, instead of making 1024 separate P+ openings (for a 1024 bit RAM organized 32 × 32 matrix) only 32 column shaped openings are required for the P+ diffusions. This reduces the probability of errors and increases yield.

Figure 6A:
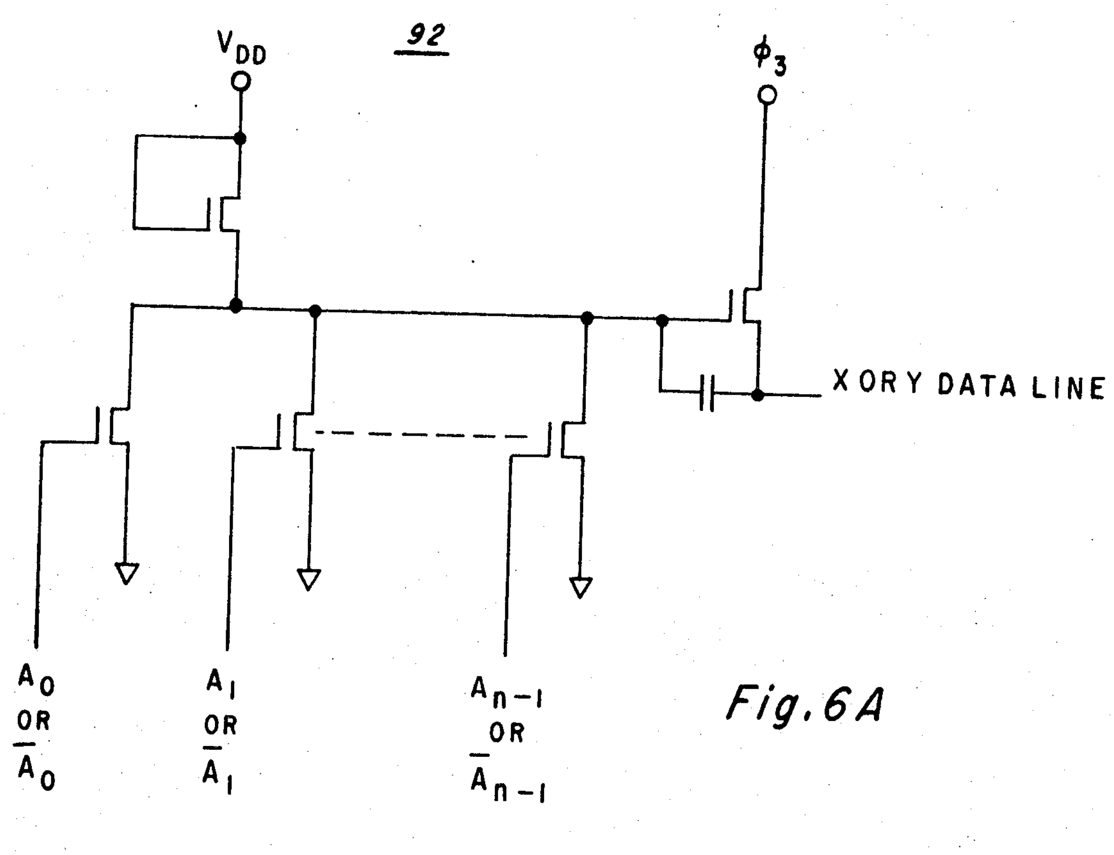
FIG. 6 is a schematic of a decode circuit that may be utilized in the memory system of FIG. 1.
Figure 6B:
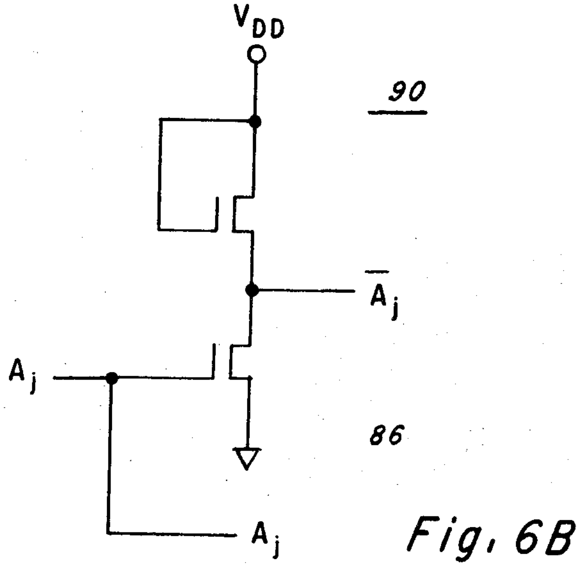

With reference to FIGS. 6*a* and 6*b*, a decode circuit suitable for use with the present invention is illustrated. For each input signal $A_j$ an input buffer, such as shown generally at 90 generates a true and an inverted signal, $A_j$ and $\bar{A}_j$ respectively. A separate NAND circuit such as shown at 92 is used to gate each line of the memory matrix, both X and Y. For example, in a 16 × 16 memory array, four input signals may be used to uniquely select one of the 16 X input lines and 1 of the 16 Y input lines, uniquely selecting 1 of the 256 memory cells. For each of the data lines of the matrix a four input NAND circuit may be utilized. Each NAND configuration corresponds to the data code of one of the address lines.

While a specific embodiment of the present invention has been described herein, it will be apparent to persons skilled in the art the various modifications to the details of construction may be made without departing from the scope or spirit of the present invention.

What is claimed is:

1. A matrix of randomly selectable insulated gate field-effect transistor memory cells integrated on a semiconductor chip comprising in combination:

a. a semiconductor substrate of one conductivity type;

b. a first set of substantially parallel elongated diffused regions of opposite conductivity type extending from the surface of said substrate and defining respective column data input lines of said matrix;

c. a second set of substantially parallel elongated diffused regions of said one conductivity type and having a higher conductivity than said substrate, said second set of regions being spaced from and interleaved in a substantially parallel relationship with said first set of diffused regions;

d. a third set of diffused regions of said opposite conductivity type overlying selected spaced apart portions of said second set of diffused regions and forming P-N junctions therewith, each of said third set of regions extending at the surface of said substrate laterally beyond the boundary of the underlying diffused region of said second set, the distance between the boundary of each of said third diffused regions and an adjacent region of said first set of diffused regions defining the channel of an insulated gate field-effect transistor;

e. a relatively thick insulating layer overlying said substrate having relatively thin regions in registry with each of said channels; and f. a set of spaced apart elongated conductive strips substantially perpendicular to said first set of elongated regions overlying said thin regions of said insulated layers to form gates of the field-effect transistors defining said matrix of memory cells.

2. A matrix of randomly selectable memory cells as set forth in claim 1 wherein said substrate comprises P-type silicon and said first, second and third sets of diffused regions are respectively N+, P+ and N+ types.

3. A matrix of randomly selectable memory cells as set forth in claim 2 wherein said substrate comprises N-type silicon and said first, second and third sets of diffused regions are respectively P+, N+ and P+ types.

4. A dynamic data storage cell comprising:

a. a semiconductor wafer of one conductivity type;

b. a first diffused region of opposite conductivity type extending from the surface of said wafer and forming one electrode of an insulated gate field-effect transistor;

c. a second diffused region of said one conductivity type spaced from said first diffused region;

d. a third diffused region of said opposite conductivity type extending from the surface of said wafer into said second diffused region, forming a P-N junction therewith, the boundary of said third diffused region adjacent said first diffused region extending closer to said first region than the corresponding boundary of said second diffused region, said third diffused region forming a second electrode of an insulated gate field-effect transistor;

e. a relatively thick insulating layer covering said wafer, said layer having a relatively thin region overlying the surface of said wafer intermediate said first and third diffused regions to form a channel region of an insulated gate field-effect transistor; and f. a metal layer overlying said thin insulated region whereby in response to an electrical signal applied to said conductive layer the amount of electrical charge stored in said one electrode due to the inherent metal-insulator-semiconductor capacitance and P-N junction capacitance between said second and third diffused regions may be varied to represent logic 1 and logic 0 levels.

5. In a dynamic random access memory that includes a matrix of memory cells randomly addressable in response to decoded input signals wherein data is represented in the form of an electrical charge stored by the inherent capacitance of an insulated gate field-effect transistor and P-N junction capacitance, means for refreshing the stored data during each cycle of operation, and means for operating on stored data, the improvement comprising a memory cell requiring only one insulated gate field-effect transistor, said memory cell including a substrate of one conductivity type that serves as circuit ground, spaced apart source and drain diffusions of opposite conductivity type extending to the surface of said substrate, a highly doped diffused region of said one conductivity type underlying the source diffusion and forming a P-N junction therewith to enhance P-N junction capacitance, and a gate formed over a thin insulating region overlying the substrate area between the source and drain diffusions for selectively varying the capacitance stored at the source node of said insulated gate field-effect transistor.

6. A dynamic random access memory as set forth in claim 5 wherein said highly doped diffused region of said one conductivity type is characterized for each column data input line of said matrix as an elongated continuous doped region and wherein said source diffused regions are characterized by a plurality of spaced apart diffused regions overlying portions of said elongated highly doped diffused region at locations where memory cells in the column are desired.

* * * * *